P. R. G. PHORSON.
HOLDER FOR PNEUMATIC HAMMERS.
APPLICATION FILED JAN. 14, 1919.
1,319,792.
Patented Oct. 28, 1919.
2 SHEETS—SHEET 1.
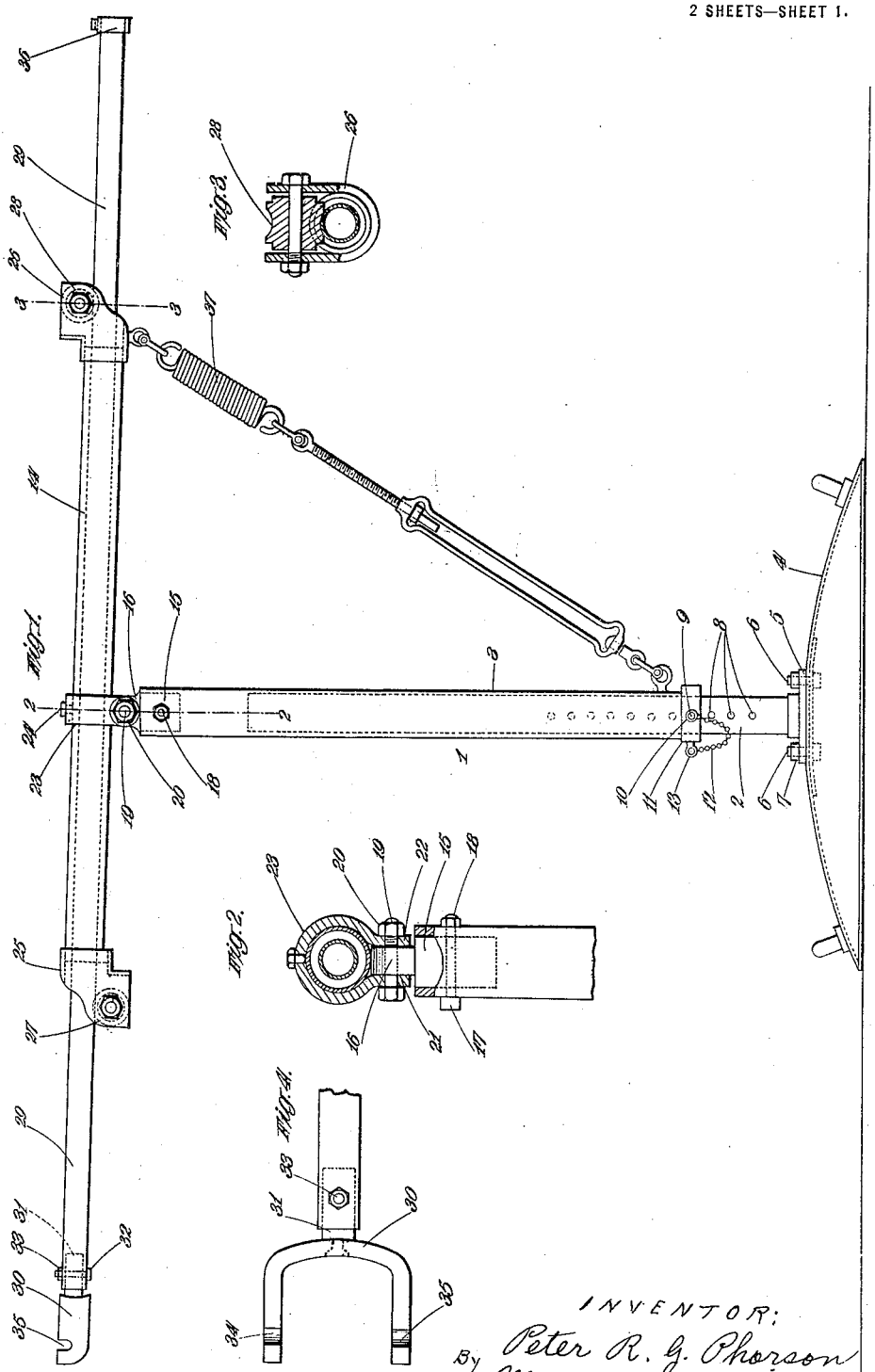
INVENTOR:
Peter R. G. Phorson
By Wm Wallace White
ATT'Y.

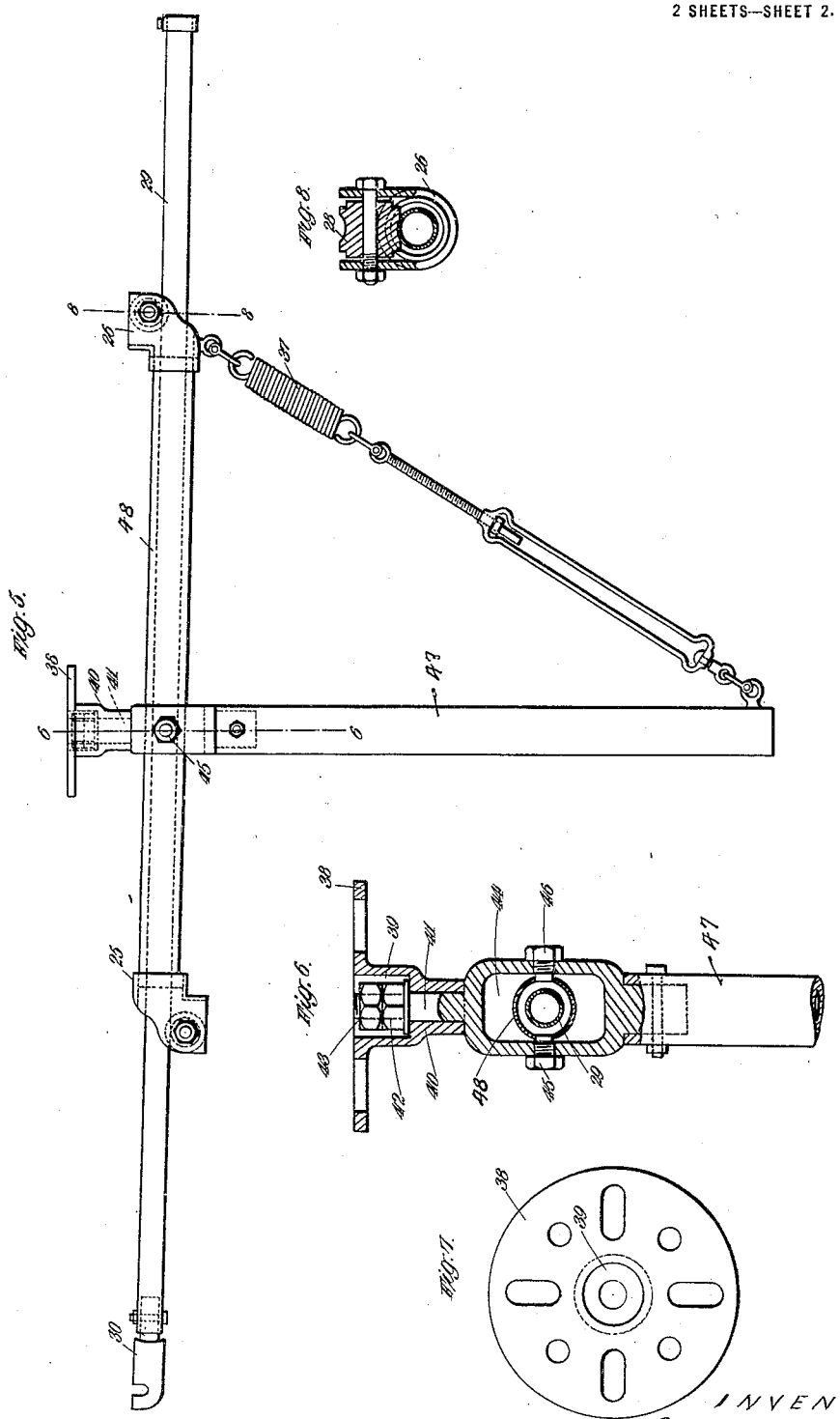

though the tube 14 can be slid through the strap 23, after the set screw 24 has been slackened, to any desired extent in either direction and can be clamped in the desired position by merely tightening the set screw 24.

UNITED STATES PATENT OFFICE.

PETER RIDDELL GRAY PHORSON, OF SUNDERLAND, ENGLAND.

HOLDER FOR PNEUMATIC HAMMERS.

1,319,792. Specification of Letters Patent. Patented Oct. 28, 1919.

Application filed January 14, 1919. Serial No. 271,182.

*To all whom it may concern:*

Be it known that I, PETER RIDDELL GRAY PHORSON, of North Sands Shipbuilding Yard and Manor Quay Repairing Works, in Sunderland, England, subject of the King of Great Britain and Ireland, have invented certain new and useful Improvements in or Relating to Holders for Pneumatic Hammers, of which the following is a specification.

This invention relates to holders for pneumatic hammers, rivets, and other pneumatically actuated tools requiring to be held up to the work, and has for its object to provide an improved device of this kind which can be moved about and is adapted to be readily set up in any desired position according to the nature and locality of the work.

The improved holder according to this invention comprises a tube pivotally mounted relatively to the work, a spring or equivalent means constantly tending to tilt the tube and a rod arranged to slide in the tube having one end fitted with means for receiving and supporting the hammer or other tool.

In order that the invention may be clearly understood a preferred construction of the same will now be described by way of illustration with reference to the accompanying drawings, in which Figure 1 is a side view of a tool holder constructed according to this invention; Fig. 2 is a sectional view on the line 2—2 of Fig. 1; Fig. 3 is a sectional view on the line 3—3 of Fig. 1; Fig. 4 is an enlarged plan view of the tool holder shown on the extreme left of Fig. 1; Fig. 5 illustrates a modification of the construction shown in Fig. 1; Fig. 6 is a sectional view on the line 6—6 of Fig. 5; Fig. 7 is a plan view of Fig. 6, certain parts being removed; Fig. 8 is a sectional view on the line 8—8 of Fig. 5.

Referring to Figs. 1 to 4 of the drawings, a telescopic tubular upright member 1 is provided consisting of an inner tube or part 2 and an outer tube or part 3 adapted to slide over the inner tube 2 which is bolted upon a base 4 of any suitable form by means of a flange 5, fixed or joined by any suitable means upon or to the lower end of the part 2, bolts 6 and nuts 7. The base 4 may conveniently be provided with wheels or rollers to facilitate moving the holder from place to place. The inner tube 2 is pierced on diametrically opposite sides with a series of holes 8 to enable the outer tube 3 to be supported at any desired height upon the inner tube 2 by means of a pin 9 passing through one of the pairs of holes 8 under a washer or ring 11 surrounding the inner part 2 beneath, and loosely in contact with, the lower end of the outer tube 3, the pin 9 being conveniently secured by means of a chain 12 secured to a ring 13 screwed into the ring 11. With this arrangement it will be seen that after adjusting the desired height of the outer tube 3 by means of the pin 9 passed into the holes 8, the said part 3 is then capable of swiveling around the inner tube 2.

The upper end of the outer tube 3 of the upright member 1 is provided in the construction illustrated, with pivoted clamping means which may take various forms, adapted to be tilted backward and forward at will and at the same time to clamp a member 14 transversely arranged relatively to the upright member 1. In the form shown, the upper end of the outer tube 3 of the upright member 1 terminates in, and is closed by, an inverted cup-shaped member 15 on which is a lug 16 and which is secured in the tube 3 by means of a bolt 17 passing through holes suitably arranged on opposite sides of the tube 3 and of the inverted cup-shaped member 15 (Fig. 2), and a nut 18. The lug 16 is pierced with a hole through which passes a bolt or pin 19, secured in any convenient manner, as by a nut 20, and forming a pivot for the downwardly depending ends 21, 22 of a circularly formed metal strap 23 in which the transverse member 14 is held with a fairly close fit and can be rigidly clamped therein by means of a set-screw 24 working in the said strap. With this arrangement the tube 14 can be slid through the strap 23, after the set screw 24 has been slackened, to any desired extent in either direction and can be clamped in the desired position by merely tightening the set screw 24.

In the form of construction shown sockets 25, 26 are fixed one upon each end of the tube 14, one of these sockets 25 having downwardly depending cheeks carrying a grooved roller 27, and the other socket 26 having upstanding cheeks (Fig. 3) carrying a grooved roller 28, these rollers being adapted to bear respectively below and above a rod 29, which may be solid or tubular, loosely carried by the tube 14 and having a length considerably greater than that of the tube 14. One end of the rod 29, for instance the left hand end as seen in Fig. 1, is fitted with a forked head 30 (Figs. 1 and 4) capable of swiveling around a shank 31 which is secured upon the end of the rod by any suitable means as by the bolt 32 and nut 33 shown, the head 30 being designed to carry the hammer or other tool requiring to be held up to the work; for this purpose the arms of the fork may conveniently be provided with recesses 34, 35 (Fig. 4) forming bearings adapted to receive trunnions on the casing of the hammer; the head 30 of the rod 29, however, may be fitted with any other desired supporting member or device according to the nature and form of the tool requiring to be supported, the construction of the head 30 shown in the drawings being merely given by way of example. On the opposite end of the rod 29 is fixed a ring 36 constituting a stop to prevent the rod 29 from being drawn to the left (as seen in Fig. 1) beyond the point at which the ring 36 comes into contact with the roller 28 carried upon the end of the tube 14; but any other suitable device may be used for this purpose such for example, as a through bolt passed through holes in the tube 29 and secured by a nut.

In order that the hammer or other tool supported in the head 30 of the rod 29 may be held or fed up to the work a tension spring 37 is arranged in the manner shown in Fig. 1 connected between a ring on the socket 26 on the end of the tube 14 remote from the hammer and a ring fixed to, and near the lower end of, the outer tube 3 of the telescopic upright member 1. But it is to be understood that any other equivalent device or arrangement may be provided; for instance a compression spring might be arranged to act upon the opposite end of the tube 14; or, instead of the tension spring 37 a weight might be suspended from the socket 26; or, a fluid pressure cylinder and piston might be employed and be suitably connected for the same purpose.

In operation assuming the hammer is to be used for riveting the bottom of a vessel, the stand 4 (with the other parts carried thereby) is placed beneath the vessel and adjusted so that the hammer is pressed against the plate by the action of the spring 37. The outer tube 3 can then be turned on a vertical axis constituted by the inner tube 2 to any desired position and the sliding rod 29 be moved to bring the hammer over the rivet to be fixed. When all the rivets within the range of the holder have been fixed, the holder can be easily moved to another position.

Figs. 5 to 8 illustrate a modified construction of the holder suitable for employment when it is desired to secure the holder to the work. In this construction a base 38 having a flange (Fig. 7) provided with holes is secured by means of bolts or studs and nuts to the work, for instance to the side or bottom of a ship's hull. The central part of the base 38 is made with a cup-shaped recess 39 terminating in a depending tubular portion 40 constituting a fixed pivot for a rotating member 47. The member 47 terminates at its upper end in a screwed circular extension 41 fitting within the tubular portion 40 of the base 38, the said extension 41 being supported in the tubular portion 40 by means of nuts 42, 43, it being understood that the extreme upper end of the extension 41 must not project, when the nuts 42, 43 are fully tightened up, above the upper surface of the base 38 as seen in Figs. 5 and 6. Immediately beneath the extension 41 the member 47 is provided with an oblong opening 44 through which the transverse tube 48 is passed, the tube 48 being supported in the opening 44 of the member 19 by means of screws 45, 46 (Fig. 6) passing through holes in the sides of the said opening and into holes formed for the purpose in the sides of the tube 48.

The rotating member 47 is provided with a downwardly depending extension to the lower end of which one end of the tension spring 37 is connected as shown and the operation of this construction is the same as with the construction illustrated in Figs. 1 to 4, it being understood that the opening 44 is of sufficient length to enable the tube 48 to be tilted up and down to the desired extent.

What I claim as my invention, and desire to secure by Letters Patent, is:—

1. A holder for supporting a pneumatically actuated tool, comprising a hollow member, a pivoted support therefor, means for securing the hollow member at any desired point in its length in said support; a rod longer than and arranged to slide through the hollow member, means on one end of the rod for holding a tool, and means continuously tending to tilt the other end of the rod around the pivot of said support.

2. A holder for supporting a pneumatically actuated tool, comprising a swiveled support for the holder, a pivot thereon substantially at right angles to the axis of rotation of said support, a tilting strap mounted on the pivot, a tube supported in the strap, a rod longer than and sliding through the tube, means on one end of the rod for holding the tool, and means acting upon the tube continuously tending to tilt the other end of the rod around the said pivot.

3. A holder for holding a pneumatically operated tool up to the work comprising a fixed base, a fixed pivot secured to and projecting from the said base, a member rotating on the fixed pivot, means for supporting the rotating member thereon, a strap mounted upon the upper part of the rotating member, means for securing the strap to the said member enabling the strap to be tilted relatively thereto, a tube passing through the strap, means for securing the tube in the strap, a tension spring arranged between one end of the tube and a part of the rotating member, a rod passing through the tube, a socket on one end of the tube, a roller journaled therein bearing against one side of the rod, a socket on the other end of the tube, a roller journaled therein bearing against the opposite side of the rod, a member fixed to one end of the rod for supporting the tool and a stop device fixed to the other end of the rod.

4. A holder for holding a pneumatically operated tool up to the work comprising a fixed base, a fixed pivot secured to and projecting from the said base, a member rotating on the fixed pivot, means for supporting the rotating member thereon, an opening in the upper part of the rotating member, a tube passing therethrough, means for supporting the tube in the said opening enabling it to be tilted therein, a tension spring arranged between one end of the tube and an extension of the rotating member, a rod passing through the tube, a socket on one end of the tube, a roller journaled therein bearing against one side of the rod, a socket on the other end of the tube, a roller journaled therein bearing against the opposite side of the rod, a member fixed to one end of the rod for supporting the tool and a stop device fixed to the other end of the rod.

In testimony whereof I have signed my name to this specification.

PETER RIDDELL GRAY PHORSON.

Copies of this patent may be obtained for five cents each, by addressing the "Commissioner of Patents, Washington, D. C."